Sept. 30, 1969 S. T. ROWAN 3,469,804
ROTARY AND CIRCULAR SAUCER-SHAPED AIRFOIL AIRCRAFT
Filed April 8, 1968 5 Sheets-Sheet 3

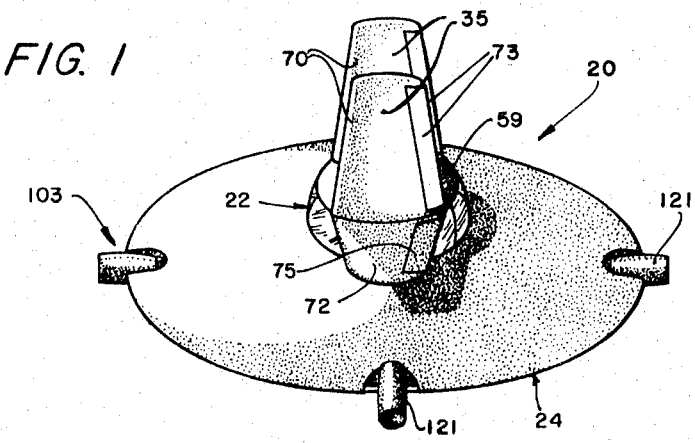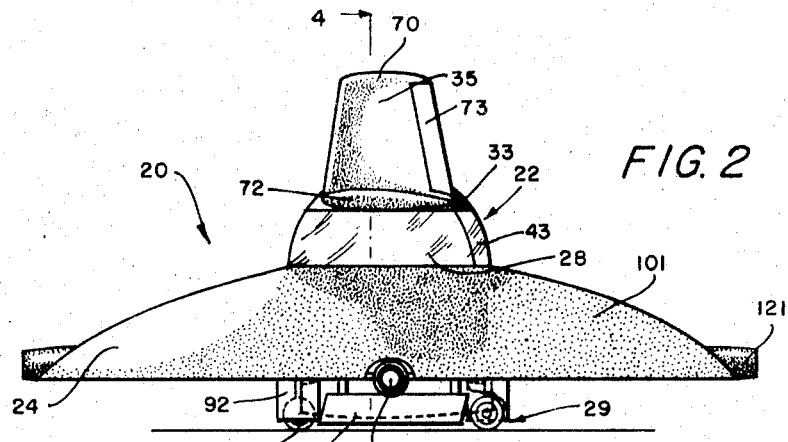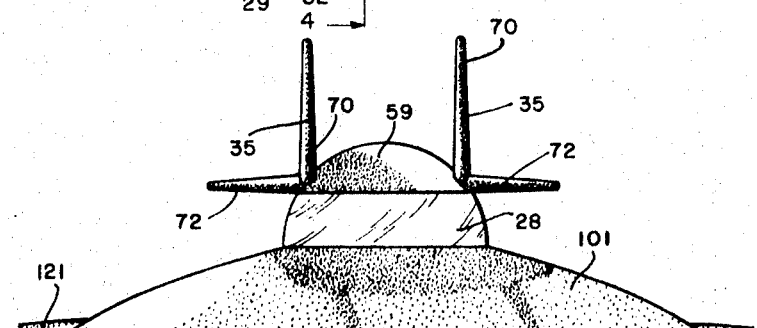

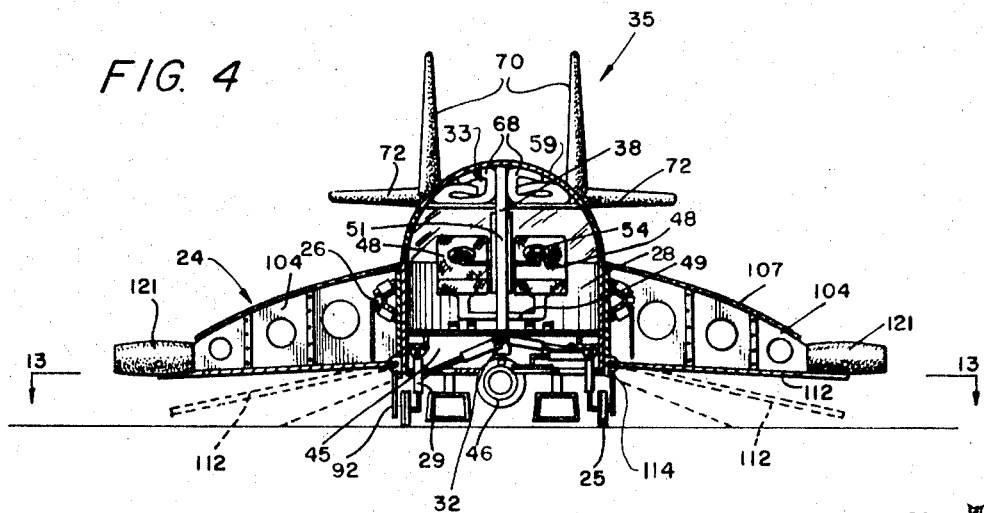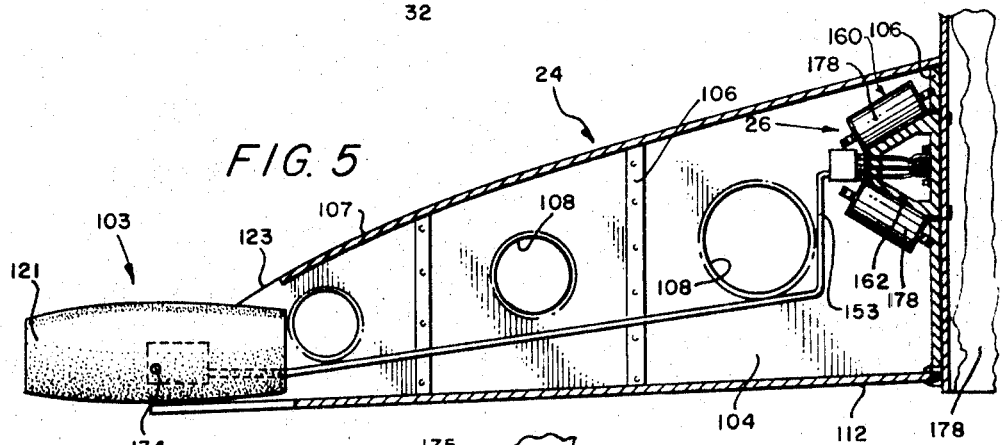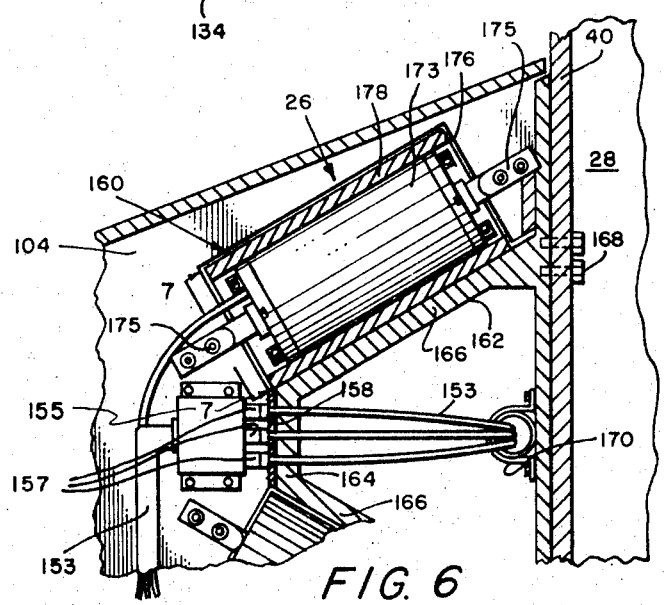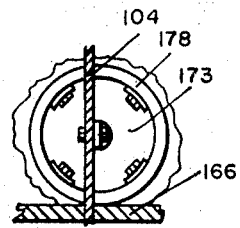

INVENTOR.
STEVEN T. ROWAN
BY
John H. Widdowson
Phillips A. Ben
ATTORNEYS

Sept. 30, 1969
S. T. ROWAN
3,469,804
ROTARY AND CIRCULAR SAUCER-SHAPED AIRFOIL AIRCRAFT
Filed April 8, 1968
5 Sheets-Sheet 4
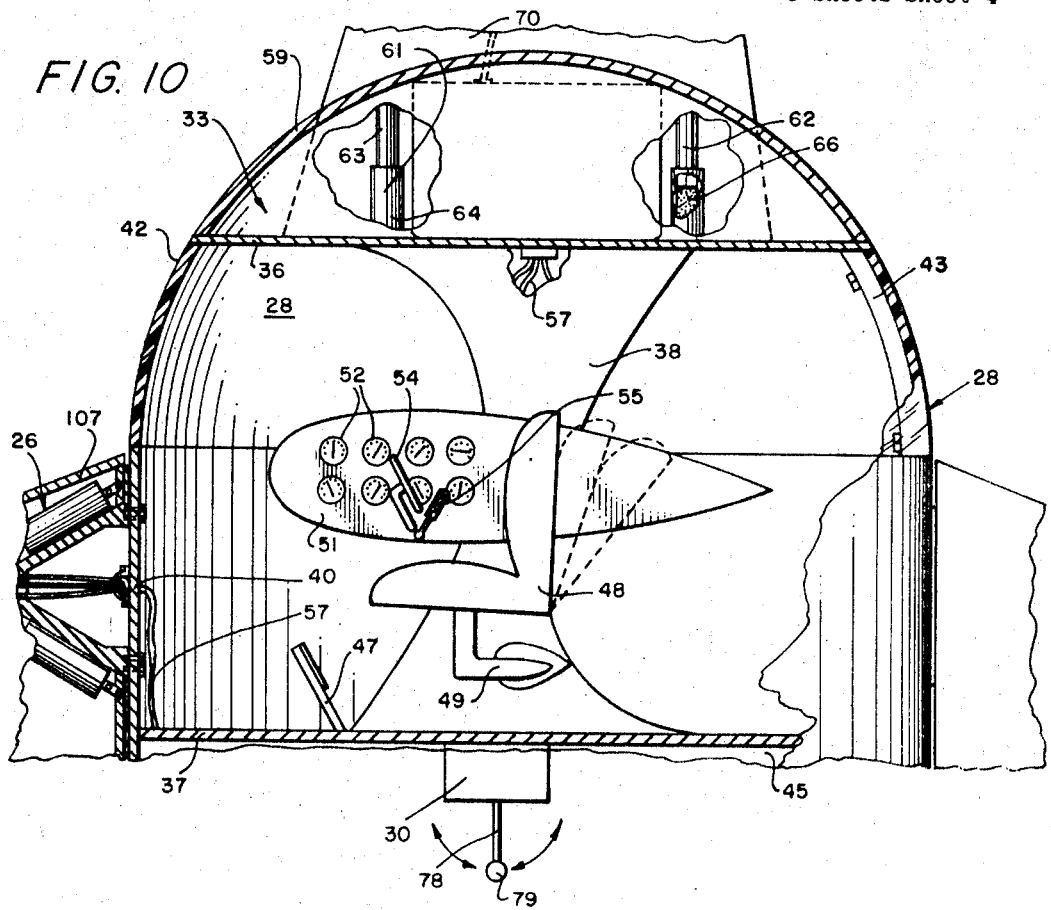
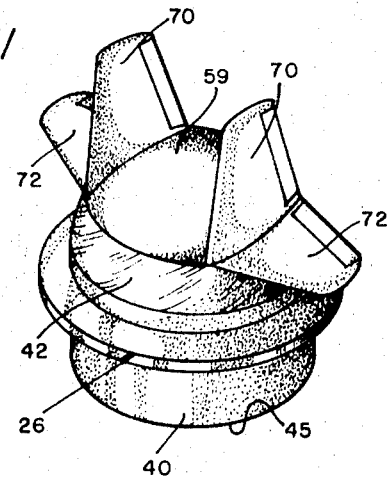
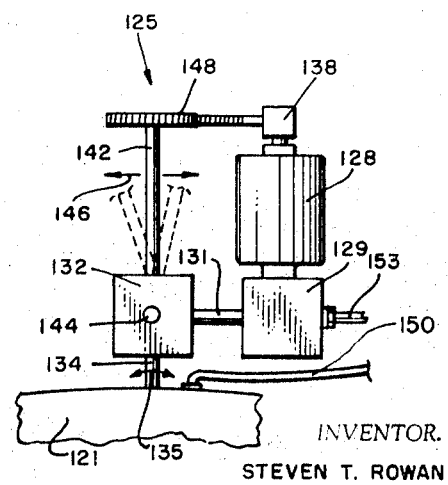
INVENTOR.
STEVEN T. ROWAN
BY
John H. Widdowson
Phillip A. Gein
ATTORNEYS Sept. 30, 1969     S. T. ROWAN     3,469,804
ROTARY AND CIRCULAR SAUCER-SHAPED AIRFOIL AIRCRAFT
Filed April 8, 1968     5 Sheets-Sheet 5
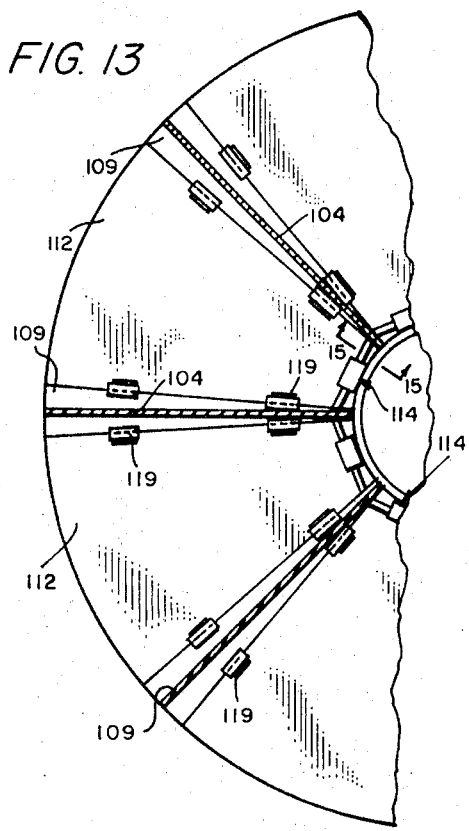
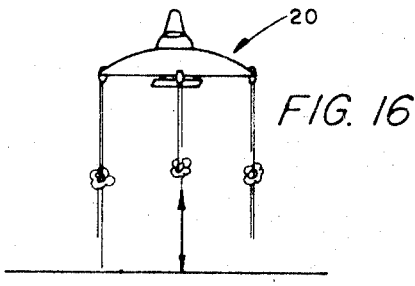
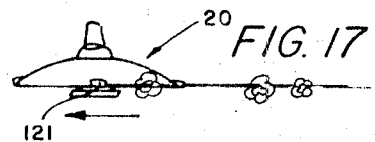
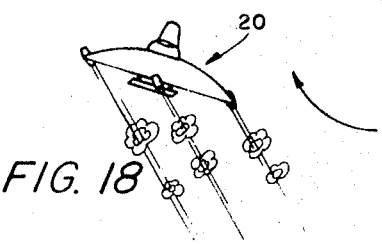
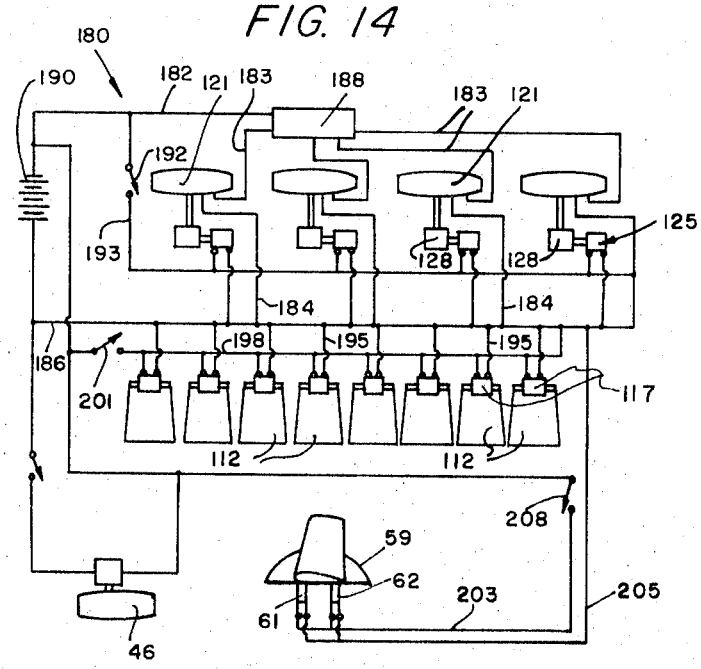
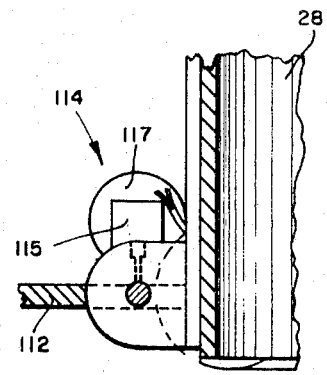
INVENTOR.
STEVEN T. ROWAN
BY
ATTORNEYS

United States Patent Office 3,469,804
Patented Sept. 30, 1969

3,469,804
ROTARY AND CIRCULAR SAUCER-SHAPED
AIRFOIL AIRCRAFT
Steven T. Rowan, 235 S. Chick, Colby, Kans. 87701
Filed Apr. 8, 1968, Ser. No. 719,526
Int. Cl. B64c 15/02, 29/04
U.S. Cl. 244—12                                 10 Claims

ABSTRACT OF THE DISCLOSURE

This invention relates to a rotary airfoil aircraft and, more particularly, to a saucer-shaped aircraft capable of both vertical and horizontal flight. Still more specifically, this invention relates to an airfoil aircraft including a central pilot's control compartment; a circular airfoil wing means rotatably mounted on and extended laterally from the control compartment; and power means pivotally connected to the outer periphery of the airfoil wing means to provide vertical, horizontal, and any combination thereof of propulsion. This invention also relates to an airfoil aircraft capable of take-off, vertically, flight in all directions, landing anywhere, and having parachute means mounted thereon for soft landing in cases of emergency to provide the utmost in safety.

---

As seen in the prior art, there have been numerous efforts directed toward the designing and development of an aircraft which is capable of vertical take-off and landing operations while still being able to move in a generally horizontal flight path at great speeds and efficiency. The prior art efforts exerted toward developing an operational procedure for such an aircraft have been directed toward the use of aircraft in which a take-off or landing operation usually has the longitudinal axis of the fuselage disposed in a plane perpendicular to the ground so that the aircraft is propelled upwardly in a vertical direction and, upon reaching desired altitude, the aircraft is then rotated by means of the propulsion units to assume a horizontal position which is the normal flight attitude of an airplane. The problems in the prior art aircraft have been in developing an aircraft capable of both helicopter-type hovering flight and also high speed horizontal flight while still maintaining safety, reliability in operation, and being generally economical to manufacture, maintain, and use. In an aircraft operation of this type, the greatest difficulty is in carrying forth such a flight operation which entails the turning and rotating of the aircraft when in one position to the other position, in other words from horizontal to vertical flight, while at the same time maintain the aircraft in a proper airborne altitude to prevent the same from falling or crashing to the surface.

In a preferred specific embodiment of the rotary and circular airfoil aircraft of this invention, the aircraft includes a central pilot control compartment means having a rotatable airfoil wing means mounted thereon, the aircraft being capable of landing upon retractable landing gear assemblies mounted on the compartment means in a conventional manner either as a helicopter or a conventional aircraft. The pilot's compartment means is provided with an instrument or control panel adapted to seat at least two operators therein, and is provided with a circular windshield assembly so as to provide easy visual observance in all directions. A parachute safety means is mounted on top of the pilot's control compartment above the windshield assembly having a cover member adapted to be selectively exploded therefrom to release a parachute member for slow, safe, decent of the aircraft in cases of emergency when the propulsion power fails. A pair of identical aileron control means are mounted on opposite sides of the parachute safety means on the control compartment means operable to maintain stabilized flight. Additionally, a pair of longitudinally extended parallel fixed aileron structures are connected to and downwardly depending from the bottom surface of the control compartment means to aid in maintaining stabilized flight. The airfoil wing means is provided with a plurality of, preferably four, equally spaced jet propulsion motor means mounted on the outer periphery and having motor control means connected thereto operable to rotate each jet motor means in horizontal and vertical directions. The airfoil wing means is provided with an upper skin secured to a plurality of radially extended upright support struts and a plurality of movable panel members secured to the undersurface of the struts adding substantial rigidity and being of an overall airfoil shape in transverse cross section. This results in a rotatable wing structure operable to achieve highly efficient lift. Between the radially extended support struts are placed fuel compartments adapted to supply fuel to the individual jet propulsion motor means for ignition in a timed sequence to provide the proper propulsion. Each jet propulsion motor means is adapted to be rotated about a horizontal axis by the motor control means so as to be extended substantially vertical for use of the airfoil aircraft in hovering and lifting off the support surface substantially similar to a helicopter aircraft. Additionally, the airfoil aircraft is provided with a leveling means having a pendulum type actuator system operable to control the supply of fuel to respective ones of the jet propulsion motor means to provide additional thrust required to maintain the aircraft in a generally level condition at all times except when the leveling means is overcome in providing for changing altitudes of the aircraft, etc. The airfoil aircraft has been described as a generally two-man aircraft; however, it is obvious that the same can be made of any size whereupon it would make a highly efficient and safe transport capable of carrying numerous passengers requiring a minimum area for take-off and landing to satisfy the needs of our modern world today.

One object of this invention is to provide a rotary airfoil aircraft overcoming the above-mentioned disadvantages of the prior art devices.

A further object of this invention is to provide a rotary aircraft of a generally saucer-shape having a central pilot's control and instrument compartment means to receive operators therein and having an outer wing means of airfoil shape in transverse cross section mounted on the compartment means operable to be rotated thereabout by propulsion means.

One further object of this invention is to provide a rotary airfoil aircraft having a circular, saucer-shaped wing means of an airfoil shape in transverse cross section rotatable as by propulsion means whereupon the propulsion means is adapted to be rotated about horizontal and vertical axes for use as (1) a jet propulsion helicopter type structure, or (2) a jet propulsion rotating wing structure operable in high speed horizontal flight.

Still another object of this invention is to provide a rotary airfoil aircraft having safety means connected thereto whereby if the aircraft loses all means of horizontal and vertical propulsion, a parachute member may be ejected providing sufficient support to the entire structure for lowering the same to the earth providing an aircraft of utmost safety.

A still further object of this invention is to provide a rotary airfoil aircraft having a central pilot's instrument and control compartment means; a rotary wing means mounted on the compartment means; jet propulsion motor means mounted on the outer periphery of the wing means; a support bearing and clutch means to control rotational movement of the pilot's control compartment relative to rotating wing means; and a central control motor means secured to the compartment means whereby the aircraft is operable to be propelled in any desired direction with a high degree maneuverability in flight.

One other object of this invention is to provide a rotary airfoil aircraft that is generally economical in operation, relatively low cost to manufacture, highly efficient in operation, operable to require a minimum amount of space for take-off and landing, and providing the safest aircraft travel means known to mankind today.

Various other objects, advantages and features of the invention will become apparent to those skilled in the art from the following discussion, taken in conjunction with the accompanying drawings, in which:

FIG. 1 is a perspective view of the rotary airfoil aircraft of this invention;

FIG. 2 is a side elevational view of the rotary airfoil aircraft of this invention;

FIG. 3 is a side elevational view similar to FIG. 2 having the aircraft rotated substantially 90 degrees about a vertical axis illustrating the normally forward view;

FIG. 4 is an enlarged cross sectional view taken along line 4—4 in FIG. 1;

FIG. 5 is an enlarged fragmentary sectional view illustrating a wing structure and a power means of the rotary airfoil aircraft of this invention;

FIG. 6 is an enlarged fragmentary sectional view of the support bearing and clutch means of the airfoil aircraft of this invention;

FIG. 7 is a fragmentary sectional view taken along line 7—7 in FIG. 6;

FIG. 10 is an enlarged fragmentary sectional view taken along line 10—10 in FIG. 8 illustrating the pilot's control compartment means of the rotary airfoil aircraft of this invention;

FIG. 11 is a perspective view of the pilot's compartment means of this invention;

FIG. 12 is an enlarged fragmentary elevational view illustrating a jet propulsion motor means and a motor control means of the rotary airfoil aircraft of this invention;

FIG. 13 is a fragmentary enlarged sectional view taken along line 13—13 in FIG. 4;

FIG. 14 is a schematic diagram illustrating a control means of the airfoil aircraft of this invention;

FIG. 15 is an enlarged sectional view taken along line 15—15 in FIG. 13 illustrating the hinge members for connecting pivotal panel members to the wing means of the airfoil aircraft of this invention; and FIGS. 16, 17, and 18 are schematic diagrams showing the rotary airfoil aircraft of this invention in various stages of flight.

Figure 8:
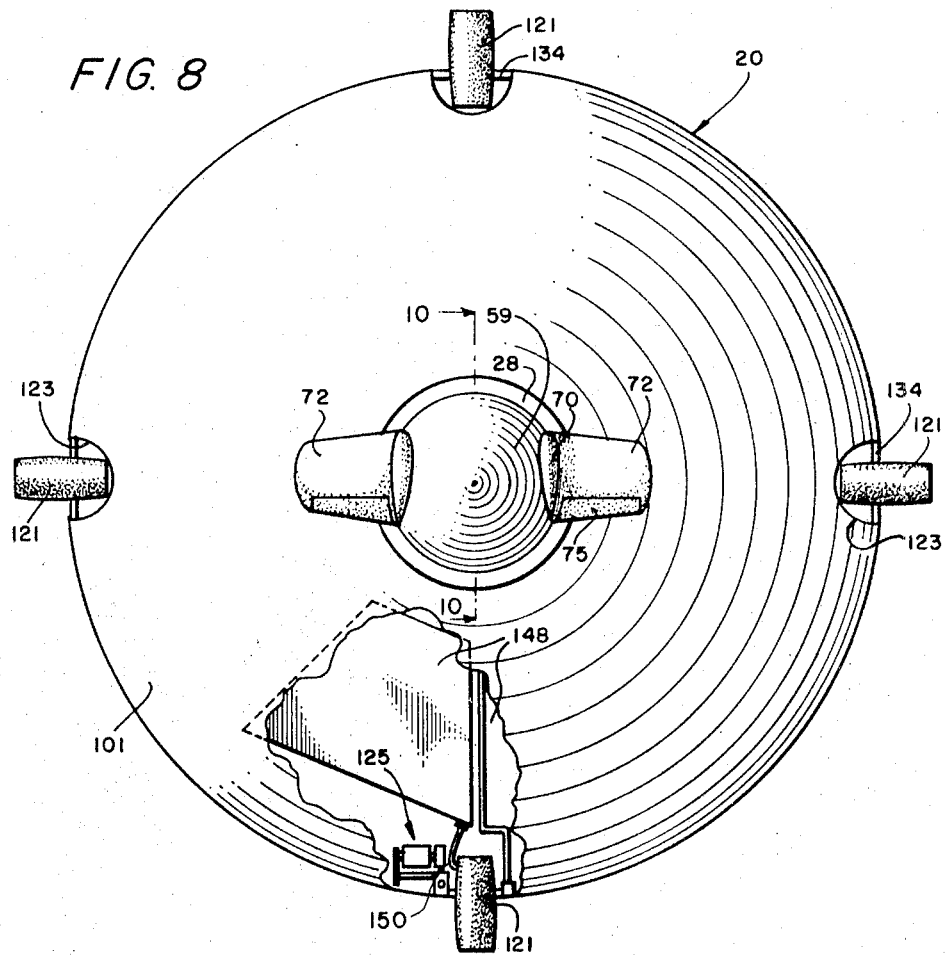
FIG. 8 is an enlarged top plan view of the rotary airfoil aircraft of this invention having portions thereof broken away for clarity.

The following is a discussion and description of preferred specific embodiments of the new rotary airfoil aircraft of this invention, such being made with reference to the drawings, whereupon the same reference numerals are used to indicate the same or similar parts and/or structures. It is to be understood that such discussion and description is not to unduly limit the scope of the invention.

Referring to the drawings in detail and in particular to FIG. 1, the rotary airfoil aircraft, indicated generally at 20, is of a circular, saucer-shape operable for combination horizontal and vertical flight. The airfoil aircraft 20 includes a main, central control housing means 22 with an airfoil wing and power means 24 rotatably mounted on the control housing means 22 by clutch and bearing means 26 for controlled rotation relative thereto.

The central control housing means 22 includes a pilot's contral compartment 28; a plurality of retractable landing gear assemblies 29 secured to the pilot's control compartment 28; an automatic leveling control means 30 secured to the undersurface of the control compartment 28; a pair of spaced aileron structures 32 secured to pilot's control compartment 28 in a downwardly depending manner; a parachute safety means 33 connected to an upper portion of the control compartment 28; and a pair of spaced aileron control means 35 mounted adjacent the parachute safety means 33 to provide stability to the aircraft in flight as will become obvious.

As shown in FIGS. 4 and 10, the pilot's control compartment 28 is of an inverted generally cup-shape having a top wall 36 and a bottom wall 37 interconnected centrally by upright contoured support post 38. The outer periphery of the top wall 36 and the bottom wall 37 are interconnected by arcuate shaped sidewalls 40 with the upper curved portion of the sidewalls 40 formed with a transparent windshield member 42 for observation therefrom. The upright sidewall 40 is povided with an access door 43 providing means for entrance and exit from the pilot's control compartment 28 as required.

The sidewalls 40 extend downwardly from the bottom wall 37 to provide a cylindrically shaped accessory area 45 adapted to receive the retractable landing gear assemblies 29 and support the spaced pair of aileron structures 32 plus a central control jet motor means 46 thereon. Additionally, the pilot's control compartment 28 includes aileron control pedals 47 and a pair of adjacent operator chairs 48 connected by support members 49 to the upright support post 38, each adapted to receive an operator therein. A unique instrument panel 51 secured to the upright support post 38 is provided with a plurality of dials 52, steering mechanism 54, control levers 55, etc. mounted thereon so as to be easily accessible on respective sides by each operator sitting in the chairs 48. It is obvious that these numerous gauges provide conventional reading such as altitude, fuel level, generator readings, oil pressure, temperature, etc. as found in the modern, high speed aircraft of today. It is obvious that the control or instrument panel 51 is connected as by a plurality of cable members 57 through the top wall 36 to parachute safety means 33 and outwardly to the airfoil wing and power means 24 to provide the necessary control and operating power.

In a preferred embodiment of this invention, the pilot's control compartment 28 is approximately six to eight feet in diameter and is provided with two of the operator chairs 48; however, it is obvious that this area may be increased and the overall airfoil aircraft 20 enlarged so that the same might be possible to carry numerous passengers in a most efficient airline type operation. The top wall 36 of the pilot's control compartment 28 is adapted to receive a canopy member 59 mounted thereon to complete the outer arcuate curve of the windshield member 42 so as to provide a smooth flowing, aerodynamic design of the overall operator's area of generally hemispherical shape. The canopy member 59 is interconnected to the top wall 36 as by a pair of spaced explosive ejector mechanisms 61 and 62, each having interconnected upper and lower cylinders 63 and 64 whereupon an explosive charge 66 mounted therein is operable to be ignited or exploded in a conventional manner through the electrical cable members 57 connected to the instrument panel 51 and operable as by a lever (not shown) thereon. On operation in cases of emergency, this upper canopy member 59 may be ejected away by the explosive ejector mechanisms 61 and 62 to reveal the parachute safety means 33 therein.

More specifically as shown in FIG. 4, the parachute safety means 33 includes enlarged, either one or a plurality of, parachutes 68 therein operable to be ejected and open on ejection of the canopy member 59. The parachutes 68 have the conventional support strands secured to the top wall 36 and the support post 38 so that when the parachutes 68 are ejected and filled with the atmosphere to the conventional mushroom shape, the entire airfoil aircraft 20 is sufficiently supported by the parachutes 68 so as to be gently lowered to the ground similar to conventional usage of parachutes. It is also obvious that the pilot's control compartment 28 is preferably constructed so as to be an airtight structure whereupon if the same lands in the sea, ocean, or the like the same will sustain flotation until the persons thereon are rescued. This is an important safety feature not found or feasible on aircraft constructed today.

As shown in FIGS. 1 through 3, inclusive, it is seen that the spaced aileron control means 35 are secured to opposite sides of the upper top wall 36 adjacent the ejectable canopy member 59 as by welding or the like. As shown in FIGS. 1 and 4, the aileron control means 35 includes upright rudder sections 70 integral with laterally extended stabilizer sections 72 extended substantially 90 degrees relative to each other. The upright rudder sections 70 are provided with control flaps or tabs 73 operable through cable members pivotally connected thereto movable through conventional control cables by the aircraft operator. The horizontally extended stabilizer sections 72 are provided with flaps or elevators 75 whereupon the flap elements 75 may be operated through the control pedals 47 within the pilot's control compartment 28 so as to provide the required directional control and stability to the aircraft substantially similar to the control members as found on the tail sections of conventional aircraft today. However, the use of spaced upright rudder sections 70, each having a separable control tab 73, provides additional stability to the overall aircraft for use in training operations as well as achieving the desired altitude and direction changes.

As shown in FIG. 10, the automatic leveling control means 30 is secured centrally of the pilot's control compartment 28 in a downwardly depending manner from the bottom wall 37 aligned with the vertical axis. The leveling control means 30 is provided with a pendulum member 78 having a lower heavy weight 79 operable to swing in any direction about an upper pivot point or member aligned with the vertical axis. The movement of the pendulum member 78 from alignment with the vertical axis of the pilot's control compartment 28 operates to activate a control mechanism (not shown) connected to the pivot member to increase and decrease power supply requirements to the outer power means as will be explained. Therefore, the leveling control means 30 operates to maintain the aircraft in level flight except when the same is overcome by the operator through the use of control means on the control instrument panel 51.

As shown in FIGS. 2 and 3, there are preferably four of the landing gear assemblies 29 provided operable in a substantially conventional manner. Each landing gear assembly 29 (FIG. 9) includes an upright main support member 81 pivotally connected by bracket 82 to the undersurface of the bottom wall 37 and having its lower end connected through an axle 84 to a wheel member 85. Intermediate the upper and lower ends of the support member 81 is a bracket 86 pivotally connected to a piston and cylinder assembly 88 having a piston member 89 movable under hydraulic pressure within a control cylinder 90. The upper end of the cylinder 90 is pivotally connected to a bracket mounted on the undersurface of the bottom wall 37. It is obvious that the respective landing gear assemblies 29 are movable from the extended position to a retracted position as shown in dotted lines in FIG. 9 within the accessory area 45 on operation of the piston and cylinder assembly 88 in a substantially conventional manner. It is obvious that the use of hydraulic pressure to operate the same has been long used in the landing gear art as well as the controls for extension and retraction which would be maintained on the control panel 51 within the compartment 28. Additionally, it is obvious that a locking mechanism would be used to secure the landing gear assemblies 29 in the down-wardly projected position. Also, an access door would be provided in the bottom wall 37 so as to allow the operators to reach the landing gear assemblies 29 in case of hydraulic and/or mechanical failure so that the same may be lowered manually if required. It is obvious that the steering mechanism 54 would be connected to the landing gear assemblies 29 so that the same may be turned as required in a conventional manner for guiding the airfoil aircraft 20 when moving upon the support surface to a docking area or the like. Additionally, it is obvious that access doors 92 would be mounted on a lower wall 94 of the accessory area 45 movable to opened and closed position when the landing gear assemblies 29 are extended and retracted, respectively.

The pair of spaced, parallel elongated aileron structures 32 are secured to the lower wall 94 of the accessory area 45 as by spaced upright support posts 96, respectively. Each aileron structure 32 is provided with an elongated main body 98 of generally trapezoidal shape in transverse cross section. The aileron structures 32 are operable to add substantial stability to the aircraft in flight in providing a downwardly depending control structure affected by the airflow to add a stabilizing feature to the overall aircraft.

Figure 9:
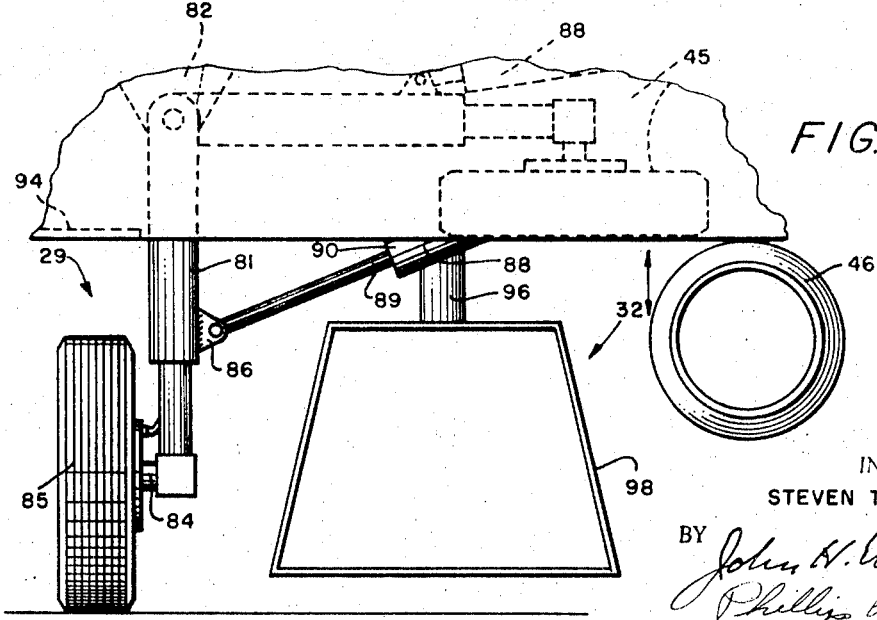
FIG. 9 is an enlarged fragmentary elevational view illustrating a retractable landing gear means of the rotary airfoil aircraft of this invention.

As shown in FIGS. 4 and 9, mounted in general alignment with the upright axis of the pilot's control compartment 28 and movable downwardly of the lower wall 94 of the accessory area 45 is the jet propulsion motor means 46 operable to control movement of the aircraft as when sitting on the ground plus provide additional power in flight as required. The jet motor means 46 is of a conventional type such as described in Patent No. 2,886,260 and can be operated as desired and required through controls on the control panel 51. The jet motor means 46 may burn a combination of fuel and oxygen carried within storage tanks in the accessory area 45 and conveyed thereto in a conventional manner. It is seen that the jet motor means 46 is extended substantially parallel and centered between the aileron structures 32 and in alignment with the direction which the aircraft is normally traveling, being the facing or forward portion of the pilot's control compartment 28 as seen through positioning of the control panel 51 and the operators' chairs 48.

The wing and power means 24 includes a main airfoil wing structure 101 provided with a plurality, preferably four, of jet propulsion motor means 103 secured to the outer periphery of the airfoil wing structure 101. The airfoil wing structure 101 is of a generally saucer-shape in transverse cross section having the control housing means 22 mounted in the center thereof. More specifically, the wing structure 101 is provided with a plurality of radially extended, generally upright support struts 104 connected to support rings 106 each strut 104 tapered downwardly outwardly so as to be of an airfoil structure as clearly shown in FIG. 4. The upper surfaces of the support struts 104 are interconnectible by a skin member 107 preferably of a lightweight aluminum to seal the upper surface and provide for smooth flow thereover. It is seen that the support struts are provided with a plurality of enlarged openings 108 usable to provide access for control members to be extended therebetween and, additionally, to provide a weight reducing means. The lower portions of the support struts 104 are extended in a generally common horizontal plane with a plurality of rigid, fixed anchor plates 109 secured thereto and having the space between the respective fixed plates 109 closed by lower skin assembly 111.

As shown in FIGS. 4 and 13, the lower skin assembly 111 includes a plurality of radially extended panel members 112 pivotally connected to the inner one of the lowermost support rings 106 as by pivotal hinge assemblies 114 which are connected through gear means 115 to a plurality of motor members 117. The panel members 112 are releasably connected to the fixed anchor plates 109 along the adjoining edges thereof as by power operated latch members 119. The motor members 117 are operable on release of the latch members 119 to pivot the respective panel members 112 downwardly to a substantially upright position. This operates to move the panel members 112 so that the entire aircraft then achieves a generally umbrella shape similar to a parachute so as to aid in gently lowering the entire aircraft when the parachute's safety means 33 is ejected as required during an emergency. However, the panel members 112 are normally in the closed position so as to provide an aerodynamically smooth aircraft providing for the highest efficiency during flight.

Each jet power motor means 103 includes a motor member 121 pivotally connected to the outer periphery of the wing structure 101 and extended through an enlarged cut-out section 123. The jet motor members 121 are of the substantially conventional type operable through the use of fuel, oxygen and/or compressed air to achieve the required thrust. All of the jet motor members 121 are connected to the outer periphery for conjoint movement through control motor means 125 for pivotal movement about individual horizontal axes between vertical and horizontal positions. Additionally, the control motor means 125 is operable to provide conjoint pivotal movement of the respective jet motor members 121 about a vertical axis substantially 15 degrees to both sides from radial alignment with the pilot's control compartment 28.

As shown in FIG. 12, the control motor means 125 includes the following connected to each jet motor member 121 and to each other electrically for conjoint actuation; a reversible motor 128 connected to a gear box 129 and shaft 131 to a universal swivel member 132 which, in turn, is connected to a support shaft 134 to the jet motor member 121 for movement about a horizontal axis as indicated by arrow 135; and the motor 128 is connected at its opposite end through a gear 138, a worm gear and shaft 148, and a central shaft 142 to the swivel member 132 for movement of the jet motor member 121 about an upright support pivot shaft 144 as indicated by an arrow 146. It is obvious that numerous types of control and connector means can be provided to achieve pivotal movement of jet propulsion motors about horizontal and vertical axes, and additionally, hydraulic controls, electric motors, or the like could be used whereupon the movement of the motors is conjointly regulated to turn in the same direction at the same time as required. Such a mechanical system is clearly illustrated in Patent No. 3,208,695 which provides for conjoint movement of interconnected jet motors and could be used in this application.

As indicated in FIG. 8, the space between the various radially extended support struts 104 is best utilized by supporting a plurality of fuel tanks 148 whereupon the centrifugal action of the rotating wing structure 101 operates to force fuel outwardly to the radially spaced jet motor members 121 through fuel lines 150 as required. It is obvious that the fuel can be selectively supplied from the tanks 148 in a predetermined manner so that each fuel tank 148 is maintained at approximately the same level so that centrifugal equilibrium of the entire airfoil aricraft 20 is maintained during flight.

As shown in FIG. 5, it is seen that each respective jet motor member 121 is provided with the necessary power for conventional ignition purposes through a pilot light, spark plug type, or other similar means by a power cable 153 from a power source which is connected to a main control box 155. As seen in FIG. 6, the control box 155 includes a plurality, namely three, electrical brushes 157 engageable with a mating collector ring 158 mounted on the clutch and bearing means 26 which is secured to the pilot's control compartment 28.

As shown in FIGS. 5 and 6, the clutch and bearing means 26 includes a plurality of cooperating pairs of clutch and roller assemblies 160 mounted between adjacent support struts 104 of the wing structure 101 and engageable with a wing support bracket assembly 162. More specifically, the bracket assembly 162 is of a generally V-shape including a central portion 164 integral with outwardly diverging support legs 166 having the outer ends of the legs 166 secured as by bolts 168 to the outer surface of the sidewalls 40 of the pilot's control compartment 28. The wing support bracket assembly 162 is of an overall, generally cylindrical shape extended about the outer periphery of the pilot's control compart 28. A bracket 170 is mounted between the support legs 166 on the compartment 28 adapted to receive the control cables therethrough connected to the connector ring 158 which is secured to the central portion 164. The brushes 157 and connector ring 158 are operable in a conventional manner to provide power at all times to the rotating wing structure 101. It is obvious that the respective power cables 153 are supplied with electrical energy for the controlled ignition of the jet motor members 121; to provide horizontal and rotational movement through the control motor means 125 of the respective jet motor members 121, and, additionally, to provide power to lights and the like to be mounted as required on the wing structure 101.

As shown in FIG. 6, each clutch and roller assembly 160 is provided with a central control cylinder 173 rotatably connected at opposite ends through brackets 175 to a respective support strut 104. Each cylinder 173 is mounted in a rectangular opening 176 in the respective strut 104. The control cylinder 173 is provided with an outer sleeve 178 in contact with the respective surface of the support leg 166 to provide main support thereto. The cable 153 is connected to the control cylinders 173 containing an electric solenoid (not shown) with a magnetic field to create a resistive force between the cylinder 173 and the solenoid. By this braking means, the pilot's control compartment 28 can be rotated through the clutch and bearing mean 26 relative to the outer rotating wing structure 101 as required so that the operators within the pilot's control compartment 28 can be facing any desired direction regardless of actual directional travel of the entire airfoil aircraft 20.

As shown in FIG. 14 in an electrical schematic diagram, a control system 180 includes the jet motor members 121 interconnected electrically as by lines 182, 183, 184, and 186 through a timing sequence mechanism 188 to a power source indicated generally at 190. A switch member 192 mounted in a line 193 is operable to energize the control motor means 125 and reversible motor 128 to cause movement of the jet motor members 121 about horizontal or vertical axes. The line 186 is additionally connected by conductors 195 to the motor members 117 operable to pivot the panel members 12 downwardly. Another conductor 198 is connected to the motor members 117 and the power source 190 having a switch 201 therein to actuate the motor members 117. A pair of conductors 203 and 205 connected to the ejector mechanisms 61 and 62 have an emergency switch 208 therein operable to eject the canopy member 59 and the parachutes 68 when required. The sequence mechanism 188 is operable to supply controlled ignition signals to the jet motor members 121 as will be explained.

The jet motor members 121 are operable, as shown in FIG. 8, on positioning rearwardly of the pilot's control compartment 28 whereupon the same is fired to provide the major forward propulsion force to the entire airfoil aircraft 20 plus a smaller tangential force to cause rotation of the wing structure 101. The control system 180 is operable through the timing sequence mechanism 188 to fire the jet motor members 121, respectively, only at reaching its proper position behind the pilot's control compartment 28. In other words, each motor member 121 is fired alternately as it approaches and achieves the desired position depending upon the flight path of the airfoil aircraft 20. The jet motor members 121 may be movable about a vertical axis up to substantially 15 degrees in either direction to provide the tangential force to the wing structure 101 to provide rotation thereof at any desired speed. It is obvious that the rotating wing structure 101 also operates as an efficient airfoil structure to provide substantial lift to the overall aircraft 20.

In the use and operation of the airfoil aircraft 20 of this invention as best shown in FIGS. 16, 17, and 18, it is obvious that on assuming the position of FIG. 3, the jet motor members 121 may be pivotal about a horizontal axis so as to be extended substantially vertical; however, it is preferred that the motor members 121 be extended so as to extend with the lower power output side at an angle outwardly of the outer periphery of the wing structure 101 so that thrust therefrom would be directed away from the lower surface of the airfoil aircraft 20. In this position the jet motor members 121 may be ignited and powered as required through the control system 180 so that the entire airfoil aircraft 20 is lifted upwardly off the support surface similar to a jet propulsion helicopter apparatus (FIG. 16). After achieving sufficient altitude, the motor members 121 may be inclined angularly relative to a vertical axis so as to provide rotational movement to the entire wing structure 101. On reaching a sufficient desired altitude, it is obvious that the motor members 121 may be controlled conjointly for movement gradually to a substantially horizontal position with the rotation of the wing structure 101 providing the majority of the required aerodynamic lift force. It is obvious that on use as a helicopter the jet motor members 121 are all fired continuously, whereupon approaching generally horizontal flight, the jet motors 121 are ignited sequentially as previously described in the control system 180 so that the rearwardmost jet motor member 121 is the one that is fired to provide forward motion to the aircraft in the desired flight pattern. It is seen that the downwardly depending stabilizing jet motor 46 may be ignited as desired to provide additional power to this aircraft 20. The aileron control means 35 are operable through the rudders 73 and the stabilizers 75 to achieve the required flight control.

The aircraft 20 can be slowed down gradually when the motor members 121 are rotated in a controlled manner to a generally upright position for lowering the aircraft to a given support surface landing as a helicopter aircraft on lowering of the landing gear assemblies 29. Additionally, it is also obvious that this aircraft in itself resembles a generally airfoil wing structure so that the same may take off and land as a conventional aircraft thereby providing the utmost in utility.

In the case of emergency, it is obvious that the canopy member 59 may be ejected by the ejector mechanisms 61 and 62 to release the parachutes 68 so as to lower the entire airfoil aircraft 20 to the supporting surface in a controlled manner. Additionally, the control motors 117 are operable to move the panel members 112 downwardly so that the entire wing structure 101 operates similar to a parachute in itself providing an umbrella structure to additionally slow down and control the downward descent of the entire airfoil aircraft 20. The air-tight type construction of the pilot's control compartment 28 operates as a floating member in case of descending within a fluid body. Additionally, the relative size of the pilot's control compartment 28 of this embodiment, namely 6 x 8 feet in diameter, to the entire airfoil aircraft 20, namely, 25 to 30 feet, provides a safe aircraft on descent by the parachutes 68 and provides sufficient area for flotation on landing on a fluid medium.

It is seen that the airfoil aircraft of this invention provides a highly efficient, new and novel circular saucer-shape aircraft that is operable in a manner similar to a combination helicopter and standard aircraft of today. The aircraft has a rotating wing structure so as to be more efficient in operation, provide the utmost safety in aircraft operation, and is movable at almost unlimited speed and direction.

While the invention has been described in conjunction with preferred specific embodiments thereof, we understand that this description is intended to illustrate and limit the scope of the invention.

I claim:

1. A rotary and circular shaped wing flying apparatus, comprising:
   (a) a central compartment body;
   (b) a circular disc-like airfoil shaped wing structure;
   (c) clutch and bearing means connecting said wing structure to said compartment body for rotation relative thereto;
   (d) a plurality of spaced jet motor members carried on said circular wing structure;
   (e) means connecting each of said jet motor members to said wing structure for pivotal movement thereof about horizontal and vertical axes; and
   (f) control means operable to regulate pivotal movement of said jet motor members and operable to fire said jet motor members sequentially whereby said jet motor members are movable to substantially vertical positions operable to lift said flying apparatus upwardly as similar to a helicopter and said jet motor members additionally movable to substantially horizontal positions to be fired sequentially to provide for forward movement of said flying apparatus and spinning movement of said wing structure.

2. A flying apparatus as described in claim 1, wherein:
   (a) said wing structure having a plurality of radially arranged compartments to contain fuel therein and operatively connected to respective ones of said jet motor members;
   (b) said control means connected to said jet motor members so that the fuel is drained from said compartments at an equal rate so that said flying apparatus is maintained in an equilibrium state under the centrifugal action on rotation of said wing structure.

3. A flying apparatus as described in claim 1, wherein:
   (a) said compartment body having a portion of said control means therein operable to regulate said jet motor members, a plurality of control members and levers connected to said control means, said compartment body, and a hemispherically shaped windshield member adapted to provide ready vision therefrom by the operators; and
   (b) said main compartment body having an upper canopy member covering a parachute ejector means therein including the canopy member connected to explosive ejector mechanisms, a parachute member mounted within said canopy member secured to said canopy body, and said ejector mechanism connected to said control means, whereupon said canopy member may be ejected in case of emergency and said parachute member is also ejected to the usage condition and said aircraft is supported by said parachute member for control descent in cases of emergency.

4. A flying apparatus as described in claim 3, wherein:
   (a) said wing structure of an airfoil shape in transverse cross section having an upper skin interconnected to radially extended support struts, the lower surfaces of said struts are secured to anchor plates, and panel members pivotally connected to said struts extended between respective pairs of said anchor plates; and
   (b) said wing structure including a plurality of motor members connected to said panel members to selectively move said panel members downwardly so as to reveal the undersurface of said wing structure to achieve a generally umbrella shape whereupon the entire said flying apparatus would act similar to a parachute in an emergency to provide for a slow descent thereof in combination with said parachute member.

5. A flying apparatus as described in claim 1, wherein:
   (a) said compartment body of a generally dome shape having a pair of spaced aileron means mounted thereon; and (b) said aileron assemblies each having an upright rudder section and a horizontal stabilizer section, each having flaps thereon movable about vertical and horizontal axes, respectively, thereby controlling the movement of said flying apparatus.

6. A flying apparatus as described in claim 5, wherein:

(a) said compartment body including a plurality of landing gear assemblies and aileron structures connected to the undersurface thereof;

(b) said landing gear assemblies each having a support wheel mounted thereon pivotally connected to said compartment body so as to be selectively movable to a retracted position within the same; and (c) said aileron structures of generally elongated and trapezoidal shape in transverse cross section adapted to control stability of said flying apparatus.

7. A flying apparatus as described in claim 6, including:

(a) a central jet motor retractably mounted on the undersurface of said compartment body between said aileron structures adapted to provide additional power to said flying apparatus and movement means for moving the same when on the support surface.

8. A flying apparatus as described in claim 1, wherein:

(a) said bearing and clutch means having roller members secured to said wing structure mounted against a support angle bracket secured to said compartment body;

(b) said roller means each having solenoid members operable to restrict relative rotational movement; and (c) said control means operably connected to said clutch and bearing means to activate said solenoid members to slow relative rotation of said wing structure to said compartment body for turning purposes.

9. A flying apparatus as described in claim 1, wherein:

(a) said control means having motor means connected to respective ones of said jet motor members operable to rotate same about a horizontal axis to a generally upright or vertical position and, additionally, operable to pivot said jet motor members about generally vertical axes so as to provide a tangential force to said wing structure for rotation thereof as required.

10. A flying apparatus as described in claim 1, wherein:

(a) said control means including a control leveling means having a pendulum member aligned to the upright axis of said compartment body and operable of movement of said flying apparatus out of alignment with said upright axis to control fuel flow and power output of said respective jet motor members to maintain said flying apparatus in an upright position at all times except when said control leveling means is in inoperative position.

References Cited

UNITED STATES PATENTS

| | | | |
|---|---|---|---|
| 2,939,648 | 6/1960 | Fleissner | 244—12 |
| 3,199,809 | 8/1965 | Modesti | 244—12 |
| 3,437,290 | 4/1969 | Norman | 244—135 |

MILTON BUCHLER, Primary Examiner

THOMAS W. BUCKMAN, Assistant Examiner

U.S. Cl. X.R.

244—39